United States Patent [19]
Horn

[11] Patent Number: 4,549,946
[45] Date of Patent: Oct. 29, 1985

[54] PROCESS AND AN ELECTRODIALYTIC CELL FOR ELECTRODIALYTICALLY REGENERATING A SPENT ELECTROLESS COPPER PLATING BATH

[75] Inventor: Richard E. Horn, Pittsburgh, Pa.

[73] Assignee: Electrochem International, Inc., Pittsburgh, Pa.

[21] Appl. No.: 608,512

[22] Filed: May 9, 1984

[51] Int. Cl.⁴ ............................................. B01D 13/02
[52] U.S. Cl. ................................ 204/182.4; 204/130; 204/151; 204/301; 204/DIG. 13
[58] Field of Search ............... 204/180 R, 180 P, 130, 204/301, DIG. 13, 151

[56] References Cited
U.S. PATENT DOCUMENTS

| | | | |
|---|---|---|---|
| 2,829,095 | 4/1958 | Oda et al. | 204/98 |
| 3,227,662 | 1/1966 | Kollsman | 204/301 |
| 3,388,080 | 6/1968 | de Korosy et al. | 260/22 |
| 3,562,139 | 2/1971 | Leitz | 204/301 |
| 3,764,503 | 10/1973 | Lancy et al. | 204/180 P |
| 4,024,043 | 5/1977 | Dege et al. | 204/296 |
| 4,076,618 | 2/1978 | Zeblisky | 210/30 R |
| 4,111,772 | 9/1978 | Horn | 204/180 P |
| 4,219,396 | 8/1980 | Gancy et al. | 204/301 |
| 4,225,412 | 9/1980 | Reiss | 204/301 |
| 4,229,280 | 10/1980 | Horn | 204/180 P |
| 4,238,305 | 12/1980 | Gancy et al. | 204/301 |
| 4,289,597 | 9/1981 | Grenda | 204/180 P |
| 4,324,629 | 4/1982 | Oka et al. | 204/180 P |
| 4,425,205 | 1/1984 | Honma et al. | 204/DIG. 13 |
| 4,439,293 | 3/1984 | Vaughan | 204/180 P |
| 4,445,984 | 5/1984 | Tison | 204/180 P |

FOREIGN PATENT DOCUMENTS 0891111 12/1981 U.S.S.R. .............. 204/301

OTHER PUBLICATIONS

Korngold, "Electrodialysis in Advanced Waste Water Treatment," Desalination, vol. 24, pp. 129-139, (1978).

Primary Examiner—Andrew H. Metz
Assistant Examiner—Terryence Chapman
Attorney, Agent, or Firm—Stanley J. Price, Jr.

[57] ABSTRACT

A process and electrodialytic cell for electrodialytically regenerating an aqueous, spent electroless copper plating bath which contains alkali metal salts as reaction products of the electroless plating process. In the process, the spent copper plating bath is introduced into a regeneration compartment of an electrodialytic cell. Anions of the alkali metal salts in the spent copper plating bath are electrodialytically transferred through an anionic membrane into an acid formation compartment. Hydroxyl ions are electrodialytically transferred through the anionic portion of a bipolar membrane to a regeneration compartment to regenerate the bath. The electrodialytic cell of the invention has means for establishing and maintaining in a plurality of regeneration compartments the spent electroless copper plating bath. The apparatus also includes means for electrodialytically transferring anions of the alkali metal salts in the spent copper plating bath from a plurality of regeneration compartments into a plurality of acid formation compartments through a plurality of anionic membranes, with at least one anionic membrane being associated with each acid formation compartment. The electrodialytic cell additionally includes means for electrodialytically transferring hydroxyl ions into the regeneration compartments through the anionic portion of a plurality of bipolar membranes, with at least one bipolar membrane being associated with each acid formation compartment.

17 Claims, 3 Drawing Figures

U.S. Patent  Oct. 29, 1985  4,549,946
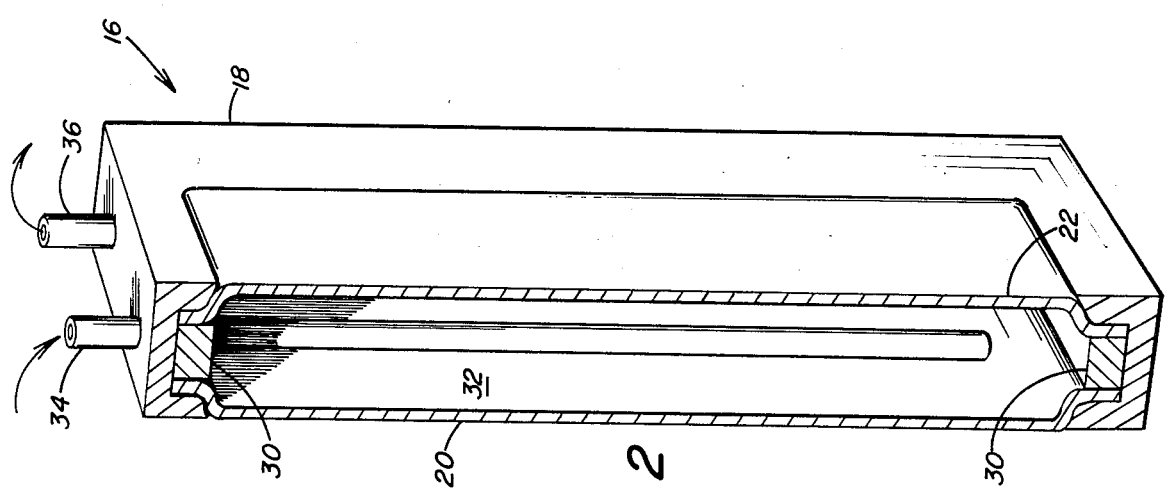
FIG. 2
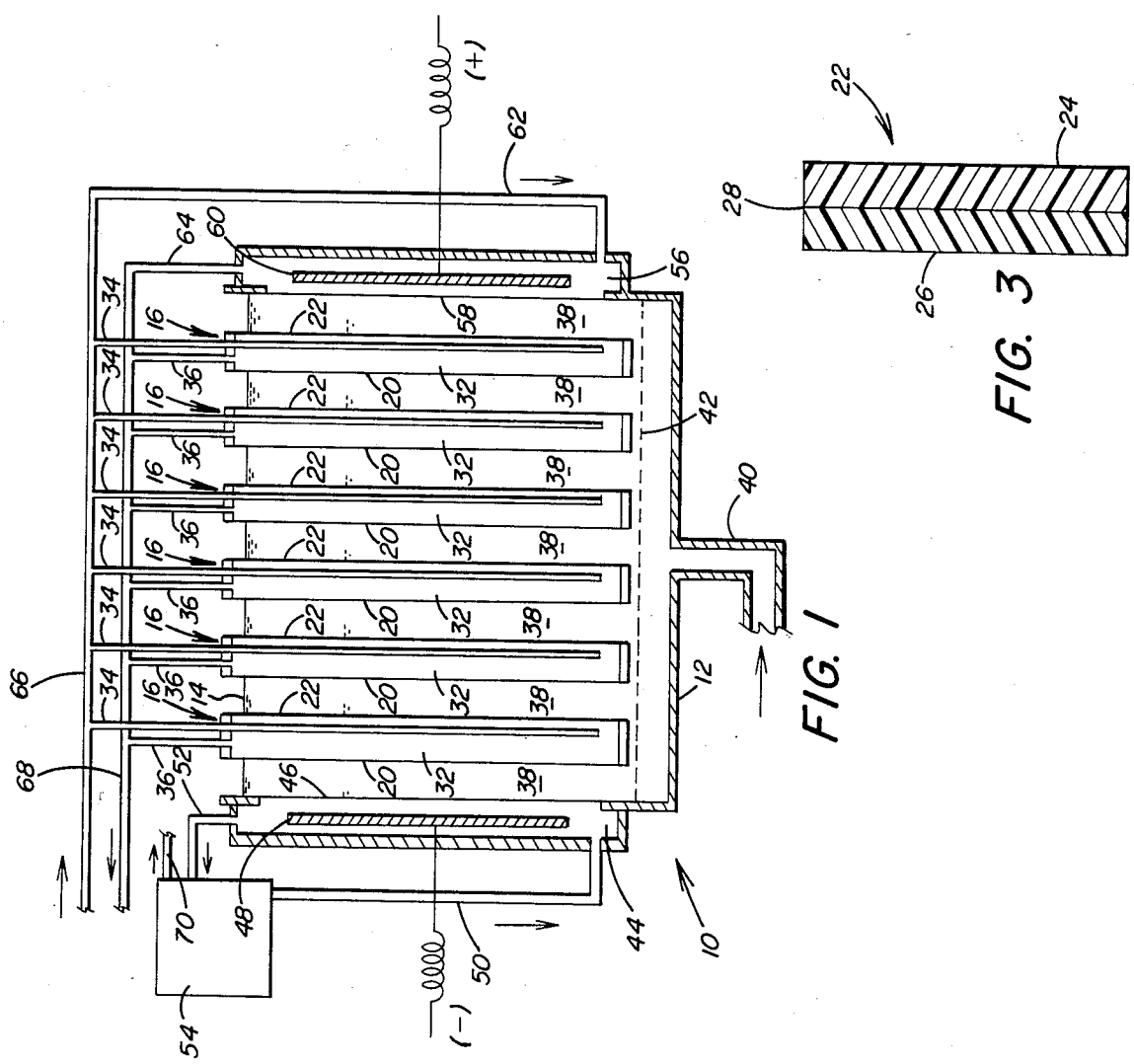
FIG. 1
FIG. 3

PROCESS AND AN ELECTRODIALYTIC CELL FOR ELECTRODIALYTICALLY REGENERATING A SPENT ELECTROLESS COPPER PLATING BATH

BACKGROUND OF THE INVENTION

1. Field of the Invention

This invention relates to the regeneration of an electroless copper plating bath and, more particularly, to a process and an electrodialytic cell for electrodialytically regenerating an aqueous, spent electroless copper plating bath, where the spent bath contains alkali metal salts as reaction products of the electroless plating process. The improved process utilizes electrodialysis to remove at least a portion of the anionic fraction of the reaction products generated in the chemical plating process.

2. Description of the Prior Art

Electroless chemical copper plating baths commercially used typically contain a water soluble salt of copper, such as copper sulfate, a reducing agent, such as formaldehyde, and an alkali, usually sodium hydroxide, to bring the plating bath into a range where the reducing agent, such as formaldehyde, has strong reducing powers. A complexing or chelating agent is commonly present in the bath to maintain the copper in solution. A commonly used complexing or chelating agent is sodium ethylenediaminetetraacetate, hereinafter referred to in the specification as EDTA. EDTA has so far been found to be highly effective in permitting the electrodialytic removal of at least a portion of the reaction products from the spent electroless copper plating bath without significant loss of the EDTA. Various brightners and stabilizers and the like are generally also included in the copper plating bath. The reducing agent, such as formaldehyde is generally effective at the higher pH values. Four moles of alkali metal hydroxide, such as sodium hydroxide, is consumed in the reduction of a mole of the metal salt, such as copper sulfate:

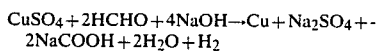

Among the reaction products of the reduction reaction in the electroless copper plating process are alkali metal salts, such as sodium formate and sodium sulfate. The build up of sodium formate and sodium sulfate in the copper plating bath leads to general bath degradation. The generation of the sodium formate and sodium sulfate in the bath also results in a drop in the pH of the cooper plating bath resulting in a loss of effective plating.

Several methods are known and are presently in use to take care of the build up of the waste materials in the copper plating bath. Among these, the simplest and one of the more costly methods is a bail-out or throwing away a portion of the spent copper plating bath; and then adding to the bath the appropriate chemical components to replenish the bath, such as alkali metal hydroxide.

Other methods are known for dealing with the problem of waste material build up in the copper plating bath. For example, U.S. Pat. No. 4,076,618 to Zeblisky discloses a method for separating alkali metal salt by-products of an electroless metal deposition bath from an alkanolamine complexing agent and a complex species of a heavy metal complexed with an alkanolamine complexing agent. In Zeblisky's method, the pH of an alkaline electroless metal deposition bath is lowered so as to render the alkanolamine complexed heavy metan and the alkanolamine complexing agent extractable by an ion exchange medium. The pH adjusted bath is contacted with an ion exchange medium to extract the alkanolamine-complexed heavy metal and the alkanolamine complexing agent from the pH-adjusted bath. A bath liquid is then removed from the exchange medium which includes alkali metal salt by-products. The alkanolamine-complexed heavy metal and the alkanolamine complexing agent is removed 1from the exchange medium. The alkanolamine-complexed heavy metal and the alkanolamine complexing agent is then returned to an alkaline electroless metal deposition bath.

U.S. Pat. No. 4,324,629 to Oka et al. discloses a process for regenerating a chemical copper plating solution. In the method of Oka et al., the pH of a chemical copper plating solution containing copper ions, a reducing agent for copper ions, a chelating agent for copper ions and an alkali metal hydroxide is adjusted to 2-11. The plating solution is led to desalting compartments of an electrodialysis cell, provided alternately with anion exchange membranes and cation exchange membranes. Counter ions to copper ions, ions formed by oxidation reaction of the reducing agent, and $CO_3^{-2}$ or $HCO_3^{-1}$ are removed. The counter ions to copper ions are at least one of $SO_4^{-2}$, $HCOO^{-1}$, $CO_3^{-2}$ and $OH^{-1}$.

U.S. Pat. No. 4,289,597 to Grenda discloses a process for electrodialytically regenerating an electroless plating bath by removing at least a portion of the reacted products. In Grenda, the spent electroless copper plating bath is conducted to a regeneration compartment of an electrodialytic cell. An aqueous electrolyte as the anolyte of the electrodialytic cell is established and maintained in an anode compartment. The anode compartment has in common one wall with the regeneration compartment that is composed of a permselective anionic membrane. Anions of the alkali metal salts in the spent electroless copper plating bath are electrodialytically transferred through the anionic membrane from the regeneration compartment to the anode compartment.

The article "Electrodialysis In Advanced Waste Water Treatment" by Korngold appearing in *Desalination*, volume 24, pages 129–139 (1978) discusses electrodialysis in the regeneration of chemical copper plating baths. This article mentions that by applying electrodialysis in a continuous mode, the sodium sulfate and formate can be removed from the spent bath, without affecting the concentrations of formaldehyde and the EDTA-complex.

U.S. Pat. No. 3,562,139 to Leitz discloses a cationic-anionic bipolar ion-exchange membrane. This patent also discloses a method and apparatus for the deionization of electrolyte solutions wherein alternatingly oriented anion-cation bilaminate ion-exchange membranes define chambers of a multi-chamber electrodialysis cell. The anion exhange laminae of the membranes bound the salt diluting chambers and the cation exchange laminae bound the salt concentrating chambers. A direct electrical current, which is periodically reversed, is passed transversely through the chambers.

U.S. Pat. No. 4,024,043 to Dege et al. discloses a single film, high performance bipolar membrane. U.S. Pat. No. 3,388,080 to de Korosy et al. also discloses a process for the production of permselective bipolar membranes.

What is needed, therefore, is a process and an electrodialytic cell which can reduce the number of different types of compartments required for electrodialysis of a spent electroless copper plating bath. What is further needed is a process and an electrodialytic cell which can promote generation of hydroxyl ions and hydrogen ions and substantially eliminate an accompanying oxidation or reduction reaction associated with such generation, the oxidation or reduction reactions occuring at the respective electrodes of the electrodialytic cell. What is additionally needed is a process and an electrodialytic cell which substantially elminates oxygen and hydrogen over voltages in the cell and thereby promotes savings of electrical energy in the electrodialysis of the spent copper plating bath. What is also needed is a process and an electrodialytic cell which substantially eliminates gases generated during electrodialysis in an electrodialytic cell and thereby promotes savings in electrical energy and a more efficient cell construction, with gas generation being primarily limited to the respective electrodes at the extreme ends of the cell.

SUMMARY OF THE INVENTION

In accordance with the present invention, there is provided a process and an electrodialytic cell for electrodialytically regenerating an aqueous, spent electroless copper plating bath, the spent plating bath containing alkali metal salts as reaction products of the electroless plating process. In the process, the spent copper plating bath is introduced into a regenration compartment of an electrodialytic cell. Anions of the alkali metal salts in the spent copper plating bath are electrodialytically transferred through an anionic membrane into an acid formation compartment. Hydroxyl ions are electrodialytically transferred through the anionic portion of a bipolar membrane to the regeneration compartment to regenerate the bath.

The process desirably includes combining the anions of the alkali metal salts with hydrogen ions in an acid formation compartment to form acids corresponding to the anions of the alkali metal salts. In the process, water is desirably introduced into the acid formation compartment to provide hydroxyl ions and hydrogen ions and to carry away the acids formed.

The present invention also provides an electrodialytic cell for regenerating an aqueous, spent electroless copper plating bath, the spent bath containing alkali metal salts as reaction products of the electroless plating process. The electrodialytic cell includes means for establishing and maintaining in a plurality of regeneration compartments the spent electroless copper plating bath. The electrodialytic cell also includes means for electrodialytically transferring anions of the alkali metal salts in the spent copper plating bath from the regeneration compartments into a plurality of acid formation compartments through a plurality of anionic membranes, at least one anionic membrane being associated with each acid formation compartment. The apparatus also includes means for electrodialytically transferring hydroxyl ions into the regeneration compartments to the bath through the anionic portion of a plurality of bipolar membranes, at least one bipolar membrane being associated with each acid formation compartment, to regenerate the bath.

Accordingly, an objective of the present invention is to provide a process and an electrodialytic cell which promotes the reduction of the number of different types of compartments required for electrodialysis of a spent electroless copper plating bath.

A further objective of the present invention is to provide a process and an electrodialytic cell which promotes generation of hydroxyl ions and hydrogen ions for bath regeneration and alkali metal salt anion removal from the bath and substantially eliminates an accompanying oxidation or reduction reaction associated with such generation, the oxidation or reduction reactions occuring at the respective electrodes of the electrodialytic cell.

An additional objective of the present invention is to substantially eliminate oxygen and hydrogen over voltages in the electrodialytic cell and thereby promote savings of electrical energy in the electrodialysis of the spent copper plating bath.

Another objective of the present invention is to substantially eliminate gases generated during electrodialysis in an electrodialytic cell and thereby promote savings of electrical energy and a more efficient cell construction, with gas generation being primarily limited to the electrode areas at the extreme ends of the cell.

These and other objectives of the present invention will be more completely disclosed and described in the following specification, the accompanying drawings, and the appended claims.

BRIEF DESCRIPTION OF THE DRAWINGS

FIG. 1 shows a schematic illustration of an electrodialytic cell of the present invention suitable for performing therein the process of the present invention.

FIG. 2 shows a portion of an acid formation compartment in partial section in elevational view.

FIG. 3 shows a portion of a bipolar membrane of an acid formation compartment.

DESCRIPTION OF THE PREFERRED EMBODIMENTS

Referring to the drawings, FIG. 1 generally illustrates in schematic form an embodiment of an electrodialytic cell of the present invention, generally designated by the numeral 10. Electrodialytic cell 10 has a tank portion 12 which provides an outer supporting frame for electrodialytic cell 10 and aids in maintaining an aqueous, spent electroless copper plating bath 14 in cell 10 during electrodialysis. An aqueous spent electroless copper plating bath as used in this description of the preferred embodiment is intended to designate an electroless plating bath in which copper sulfate, formaldehyde, and an alkali metal hydroxide, such as sodium hydroxide, have reacted forming copper from the reduction of the copper sulfate by the formaldehyde and forming an alkali metal sulfate and an alkali metal formate as reaction products. If sodium hydroxide is used as a reactant, sodium sulfate and sodium formate would be formed as the respective alkali metal sulfate and alkali metal formate reaction products.

Cell 10 has a plurality of acid formation compartments 16. Referring to FIG. 2, an acid formation compartment 16 is shown in greater detail. Acid formation compartment 16 desirably has a generally rectangular configuration, although other suitable configurations are possible. Acid formation compartment 16 has a frame member 18 of a generally rectangular, picture-frame configuration. Frame member 18 is composed of any number of suitable materials, such as plastic.

Centrally located within frame member 18 and bounded thereby is an anionic membrane 20 and oppositely positioned and spaced from anionic membrane 20 within frame member 18 is a bipolar membrane 22. Desirably, only a single anionic membrane 20 and a single bipolar membrane 22 are used in each acid formation compartment 16, these membranes being of sufficient area and size to promote the requisite electrodialytic transfer during electrodialysis. Anionic membrane 20 is an anionic semipermeable membrane which selectively will pass anions while blocking the passage of cations. Referring to FIG. 3, a portion of bipolar membrane 22 is shown in greater detail. Bipolar membrane 22 has an anionic portion 24 and a cationic portion 26 which meet at a junction 28 between anionic portion 24 and cationic portion 26. Anionic portion 24 is anionic permeable so as to selectively pass anions while blocking the passage of cations; and cationic portion 26 is cationic permeable so as to selectively pass cations while blocking the passage of anions. Anionic membrane 20 and bipolar membrane 22 are composed of suitable conventional membrane material for each respective membrane type. In acid formation compartment 16 cationic portion 26 of bipolar membrane 22 is positioned inwardly within acid formation compartment 16 in relation to anionic portion 24 of bipolar membrane 22. Anionic membrane 20 and bipolar membrane 22 are suitably joined to frame member 18 in any conventional manner. A gasket 30 is positioned between anionic membrane 20 and bipolar membrane 22 to provide separation between these membranes. The spacing between membranes 20 and 22 forms a chamber 32 within acid formation compartment 16. An inlet conduit, such as pipe 34, is provided through frame member 18 to chamber 32. Pipe 34 desirably terminates in the lower portion of chamber 32 as shown in FIG. 2. An outlet conduit, such as pipe 36, passes through frame member 18 into chamber 32. Pipe 36 desirably terminates in the upper portion of chamber 32, the termination of pipe 36 in the upper portion of chamber 32 not being shown in FIG. 2. Pipe 36 functions to remove acids formed in acid formation compartment 16 during electrodialysis. Pipes 34 and 36 are examples of suitable inlet and outlet conduits, respectively, for acid formation compartment 16; other suitable conventional configurations and arrangements can be used for these inlet and outlet conduits. Pipes 34 and 36 are composed of any suitable conventional material compatible with the electrodialytic process carried on in cell 10.

Referring to FIG. 1, a plurality of acid formation compartments 16 are positioned within tank portion 12 of cell 10 in spaced relation to each other. Acid formation compartments 16 are positioned such that a bipolar membrane 22 of one acid formation compartment 16 is in facing, spaced relation with an anionic membrane 20 of another acid formation compartment 16. This spacing of acid formation compartments 16 in cell 10 provides a plurality of regeneration compartments 38. Regeneration compartments 38 are adapted to receive and maintain the spent electroless copper plating bath 14 in cell 10. An inlet conduit 40 is desirably provided in the bottom area of cell 10 in tank portion 12 for conducting the spent copper plating bath 14 into cell 10 and into the regeneration compartments 38. A pervious support member 42 is desirably provided in the bottom area of cell 10 to promote equalization of the distribution of the spent copper plating bath 14 to the regeneration compartments 38 in cell 10. The spent copper plating bath 14 is provided to cell 10 through inlet conduit 40 from a suitable electroless copper plating tank (not shown). Conduit 40, tank portion 12, and the membrane containing surfaces of acid formation compartments 16 provide for establishing and maintaining the spent electroless copper plating bath 14 in the respective regeneration compartments 38.

Cathode compartment 44 is positioned at one end of cell 10. Cathode compartment 44 is bounded by a portion of tank portion 12 and an anionic membrane 46. A cathode 48 is positioned within cathode compartment 44. Cathode 48 is suitably connected to the negative of an electrical source (not shown). Cathode compartment 44 is connected through an inlet conduit, such as pipe 50, and an outlet conduit, such as pipe 52, to an aqueous alkali metal hydroxide source 54, such as a sodium hydroxide source. Pipes 50 and 52 are composed of any suitable material compatible with the electrodialytic process in cell 10. Cathode compartment 44 is adapted to receive the alkali metal hydroxide; and, when cathode 48 is electrically energized during electrodialysis in cell 10, hydroxyl ions would be generated and would be transferred through anionic membrane 46 to the adjacent regeneration compartment 38, thereby introducing hydroxyl ions to that regeneration compartment. Also, when cathode 48 is electrically energized, hydrogen gas is generated and provides a means to recirculate the electrolyte in cathode compartment 44. The hydrogen gas generated assists in the recirculation of the alkali metal hydroxide between cathode compartment 44 and source 54 through pipes 50 and 52.

At the end of cell 10 opposite cathode compartment 44 is positioned an anode compartment 56. Anode compartment 56 is bounded by a portion of tank portion 12 and an anionic membrane 58. An anode 60 is positioned within anode compartment 56. Anode 60 is suitably connected with the positive of an electrical source (not shown). An inlet conduit, such as pipe 62, is connected with anode compartment 56 and an outlet conduit, such as pipe 64, is also connected with anode compartment 56. Anode compartment 56 is adapted to receive through pipe 62 a source of hydrogen ions, typically water, or some aqueous solution to anode compartment 56. Upon elecrical energization of anode 60 during electrodialysis in cell 10, conduit 64 would convey from anode compartment 56 various acids formed therein during electrodialysis, and, generally, a portion of the source of hydrogen ions, such source typically being water as previously mentioned herein. Pipes 62 and 64 are composed of any suitable material compatible with the electrodialytic process in cell 10.

Anode 60 and anionic membranes 20 of acid formation compartments 16 provide for electrodialytically transferring anions of the alkali metal salts in spent copper plating bath 14 from the regeneration compartments 38 into the acid formation compartments 16. Additionally, cathode 48 and bipolar membranes 22 of acid formation compartments 16 provide for electrodialytically transferring hydroxyl ions into the respective regeneration compartments 38 to spent copper plating bath 14, when a source of hydroxyl ions, such as water, is introduced into acid formation compartments 16 through pipes 34; the water diffuses to the interface or junction 28 of the bipolar membranes 22 and hydroxyl ions generated there transfer electrodialytically through the anionic portion 24 of the bipolar membranes 22. Also, a main input conduit, such as pipe 66, is connected to pipes 34 of acid formation compartments 16 and to pipe 62 which is connected to anode compartment 56. A main outlet conduit, such as pipe 68, is connected with pipes 36 of acid formation compartments 16 and pipe 64 of anode compartment 56. Pipes 66 and 68 being composed of suitable materials compatible with the electrodialytic process in cell 10. Each regeneration compartment 38 desirably is provided with an outlet (not shown) to remove bath 14 after bath 14 is regenerated in cell 10; such outlets would desirably be positioned near the upper portion of cell 10.

In the present invention, cell 10 is basically a two compartment cell repeating unit, the two repeating compartments being acid formation compartment 16 and regeneration compartment 38. The spent electroless copper plating bath is suitably conducted from an electroless copper plating tank (not shown) and is introduced through inlet conduit 40 into the bottom area of tank portion 12 of cell 10. Spent copper plating bath 14 passes through pervious support member 42 and is introduced into the regeneration compartments 38. The copper salt present in the spent bath 14 as a source of copper ions is copper sulfate, $CuSO_4$. The complexing or chelating agent present in bath 14 is EDTA or other suitable complexing or chelating agent, such as Quadrol, NTA or HEDTA. Formaldehyde is preferred as the selected reducing agent in the plating process since the reducing power of formaldehyde increases with the alkalinity of the bath. The copper plating baths used in electroless plating are generally operated at a pH above 11. Sodium hydroxide is preferably present in the bath to provide the required alkalinity to the bath.

In the electroless plating process, for each mole of copper electrolessly plated, at least four moles of hydroxide and two moles of formaldehyde are consumed and one mole of hydrogen gas is produced according to the following equation: $CuSO_4 + 2HCOH + 4NaOH \rightarrow Cu^0 + H_2 + 2HCOONa + Na_2SO_4 + 2H_2O$.

If the reaction products of sodium formate and sodium sulfate, as shown in the above equation, are allowed to accumulate in the bath, cuprous oxide may form spontaneously within the bath leading to general bath degradation; and the pH of the bath will be lowered, thus reducing the speed of the electroless plating process. The above mentioned equation illustrates production of a spent electroless plating bath, the spent bath typically including copper sulfate, sodium hydroxide, sodium sulfate, sodium formate, and generally a chelating agent, such as EDTA, which is conducted from an electroless copper plating tank (not shown) through inlet conduit 40 and introduced into regeneration compartments 38.

With the introduction of bath 14 into regeneration compartments 38, a source of hydroxyl ions and hydrogen ions, preferably water, is introduced through pipe 66 through pipes 34 into chambers 32 of acid formation compartments 16. Water is also desirably introduced through pipe 66 to pipe 62 to anode compartment 56. An alkali metal hydroxide, preferably sodium hydroxide, is desirably introduced from alkali metal hydroxide source 54 into cathode compartment 44 through pipe 50.

When cathode 48 and anode 60 are electrically energized, current passes through cell 10 through the regeneration compartments 38 and acid formation compartments 16. The current causes hydroxyl ions at junctions 28 of the bipolar membranes 22 to be electrodialytically transferred through the anionic portion 24 of the bipolar membranes 22 to the respective regeneration compartments 38 to regenerate the bath 14. The transfer of the hydroxyl ions into bath 14 in the regeneration compartments 38 causes the pH of bath 14 in regeneration compartments 38 to rise. The current also causes the hydrogen ions at junctions 28 of the bipolar membranes 22 to be electrodialytically transferred through the cationic portion 26 of the bipolar membranes 22 into the chambers 32 of the acid formation compartments 16, the hydrogen ions being unable to pass through anionic portion 24 of the bipolar membranes 22 and the anionic membranes 20. Simultaneously, anions of the alkali metal salts are being electrodialytically transferred from bath 14 through the anionic membranes 20 into chambers 32 of acid formation compartments 16. The anions of the alkali metal salts typically are sulfate and formate ions. These anions of the alkali metal salts, the sulfate ion and the formate ion, in the preferred embodiment, combine with the hydrogen ions in chambers 32 in acid formation compartments 16 to form acids corresponding to the anions of the alkali metal salts. In the case of sulfate and formate ions, sulfuric acid and formic acid would be formed, respectively, within chambers 32 in acid formation compartments 16. This acid solution composed of sulfuric and formic acids is expelled through pipes 36 to pipe 68 and discharged for suitable disposal.

Additionally, some hydroxyl ions present in bath 14 in regeneration compartments 38 may be electrodialytically transferred into chambers 32 in acid formation compartments 16, the transfer of hydroxyl ions into acid formation compartments 16 depending upon the amount of hydroxyl ions present in bath 14 in relation to the sulfate and formate ions present in bath 14. As the sulfate and formate ions are removed from bath 14, their availability to be electrodialytically transferred into acid formation compartments 16 at the anionic membranes 20 diminishes with respect to the hydroxyl ions in bath 14. Therefore, the regenerated bath or a portion of the regenerated bath should be periodically removed from cell 10 and replaced with an appropriate amount of spent electroless plating bath when the bath has reached the requisite degree of regeneration, such as when the bath has achieved a desirable pH value to maintain the efficiency of the electrodialytic process in cell 10.

The alkali metal hydroxide, such as sodium hydroxide, in cathode compartment 44 provides hydroxyl ions for introduction into at least the adjacent regeneration compartment 38 to cathode compartment 44; and these hydroxyl ions are electrodialytically transferred from cathode compartment 44 through anionic membrane 46 into this adjacent regeneration compartment 38. Anionic membrane 46 interfaces with this adjacent regeneration compartment 38 and cathode compartment 44.

It is desirable to recirculate the aqueous alkali metal hydroxide solution in the cathode compartment 44. Such recirculation would desirably include recirculating the aqueous alkali metal hydroxide solution from cathode compartment 44 through pipe 52 through source 54 through pipe 50 and returning to cathode compartment 44. It is desirable to generate a gaseous carrier in cathode compartment 44 to aid in recirculating the aqueous alkali metal hydroxide solution. Hydrogen gas is generated at cathode 48 and serves as the gaseous carrier to aid in recirculation of the aqueous alkali metal hydroxide solution. Such recirculation promotes transfer of a sufficient amount of hydroxyl ions into the adjacent regeneration compartment 38 to cathode compartment 44, as well as aid in preventing depletion of the hydroxyl ions in the aqueous alkali metal hydroxide solution, such as a sodium hydroxide solution, in cathode compartment 44. Also, any excess hydrogen gas generated at the cathode would be discharged for suitable disposal from source 54 through an outlet conduit, such as outlet pipe 70.

Additionally, sulfate and formate ions present in bath 14 in the regeneration compartment 38 adjacent anode compartment 56 are electrodialytically transferred through anionic membrane 58 into anode compartment 56. In anode compartment 56 the sulfate and formate ions, in the preferred embodiment, combine with the hydrogen ions supplied by the water in anode compartment 56 generating sulfuric and formic acids. The sulfuric and formic acids are removed from anode compartment 56 through pipe 64 through pipe 68 to a suitable disposal. Oxygen gas would also be generated at the anode in the preferred embodiment at least a portion of which would typically be suitably removed through pipes 64 and 68.

The present invention provides a process and an electrodialytic cell for electrodialytically regenerating a spent electroless copper plating bath. Use of a two compartment repeating cell unit composed of regeneration compartments 38 and acid formation compartments 16 reduces the number of different types of compartments required for electrodialysis of the spent electroless copper plating bath promoting a simplification of the electrodialytic process. Further, during electrodialysis, bipolar membranes 22 generate hydroxyl ions and hydrogen ions with substantial elimination of an accompanying oxidation or reduction reaction at the bipolar membranes, the oxidation or reduction reactions occuring only at the respective electrodes of electrodialytic cell 10. Further, in the process and cell of the present invention, gas generation normally would not occur in the acid formation compartments 16, thereby substantially reducing oxygen and hydrogen over voltages in electrodialytic cell 10 and promoting savings of electrical energy in the electrodialytic process.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A process for electrodialytically regenerating an aqueous, spent electroless copper plating bath, said spent bath containing alkali metal salts as reaction products of the electroless plating process comprising the steps of,
   introducing said spent copper plating bath into a regeneration compartment of an electrodialytic cell,
   electrodialytically transferring anions of said alkali metal salts in said spent copper plating bath through an anionic membrane into an acid formation compartment, and
   electrodialytically transferring hydroxyl ions through the anionic portion of a bipolar membrane to a regeneration compartment to regenerate said bath.

2. The process according to claim 1 further comprising the step of,
   combining said anions of said alkali metal salts with hydrogen ions in said acid formation compartment to form acids corresponding to said anions of said alkali metal salts.

3. The process according to claim 2 further comprising the step of,
   introducing water into said acid formation compartment to provide hydroxyl ions and hydrogen ions.

4. The process according to claim 1 further comprising the step of,
   introducing hydroxyl ions into at least one said regeneration compartment including a regeneration compartment adjacent a cathode compartment.

5. The process according to claim 4 wherein,
   said hydroxyl ions are introduced into at least one said regeneration compartment from a cathode compartment in an electrodialytic cell.

6. The process according to claim 5 wherein,
   said hydroxyl ions are introduced by electrodialytically transferring hydroxyl ions through an anionic membrane from said cathode compartment into at least one said regeneration compartment.

7. The process according to claim 6 further comprising the step of,
   introducing an aqueous alkali metal hydroxide solution into said cathode compartment.

8. The process according to claim 7 further comprising the step of,
   recirculating said aqueous alkali metal hydroxide solution in said cathode compartment.

9. The process according to claim 8 further comprising the step of,
   generating a gaseous carrier in said cathode compartment to recirculate said aqueous alkali metal hydroxide solution by said gaseous carrier.

10. A process for electrodialytically regenerating an aqueous, spent electroless copper plating bath, said spent copper plating bath containing alkali metal sulfate and alkali metal formate as reaction products of the electroless plating process comprising the steps of,
    introducing said spent copper plating bath into a regeneration compartment of an electrodialytic cell,
    electrodialytically transferring sulfate and formate ions in said spent copper plating bath through an anionic membrane into an acid formation compartment,
    electrodialytically transferring hydroxyl ions through the anionic portion of a bipolar membrane to a regeneration compartment to regenerate said bath,
    combining said sulfate and formate ions with hydrogen ions in said acid formation compartment to form sulfuric acid and formic acid, and
    introducing water into said acid formation compartment to provide hydroxyl ions and hydrogen ions.

11. The process according to claim 10 further comprising the step of,
    introducing hydroxyl ions into at least one said regeneration compartment including a regeneration compartment adjacent a cathode compartment.

12. The process according to claim 11 wherein,
    said hydroxyl ions are introduced into at least one said regeneration compartment from a cathode compartment in an electrodialytic cell by electrodialytically transferring said hydroxyl ions through an anionic membrane from said cathode compartment to at least one said regeneration compartment.

13. The process according to claim 12 further comprising the steps of,
   introducing an aqueous alkali metal hydroxide solution into said cathode compartment,
   recirculating said aqueous alkali metal hydroxide solution in said cathode compartment, and
   generating a gaseous carrier in said cathode compartment to recirculate said aqueous alkali metal hydroxide solution by said gaseous carrier.

14. An electrodialytic cell having a two compartment repeating cell unit for regenerating an aqueous, spent electroless copper plating bath, said spent bath containing alkali metal salts as reaction products of the electroless plating process comprising,
   means for establishing and maintaining in a plurality of regeneration compartments said spent electroless copper plating bath,
   means for electrodialytically transferring anions of said alkali metal salts in said spent electroless copper plating bath from said regeneration compartments into a plurality of acid formation compartments through a plurality of anionic membranes, at least one said anionic membrane being associated with each acid formation compartment, said regeneration compartment and said acid formation compartment composing said two compartment repeating cell unit, and
   means for electrodialytically transferring hydroxyl ions into said regeneration compartments to said bath through the anionic portion of a plurality of bipolar membranes, at least one said bipolar membrane being associated with each said acid formation compartment, to regenerate said bath.

15. The electrodialytic cell as set forth in claim 14 further comprising,
   means for introducing hydroxyl ions into at least one said regeneration compartment including a regeneration compartment adjacent a cathode compartment in said electrodialytic cell.

16. The electrodialytic cell as set forth in claim 15 wherein,
   said means for introducing hydroxyl ions is a cathode compartment having means for generating hydroxyl ions, said cathode compartment having an anionic membrane, said anionic membrane being adapted to electrodialytically transfer hydroxyl ions therethrough to at least said adjacent regeneration compartment to said cathode compartment.

17. The electrodialytic cell as set forth in claim 16 further comprising,
   gaseous means to recirculate an electrolyte in said cathode compartment.

* * * * *